United States Patent

[11] 3,580,154

| | | |
|---|---|---|
| [72] | Inventor | Helmut Ettischer<br>Ruit/Krs. Esslingen, Germany |
| [21] | Appl. No. | 770,533 |
| [22] | Filed | Oct. 25, 1968 |
| [45] | Patented | May 25, 1971 |
| [73] | Assignee | Eastman Kodak Company<br>Rochester, N.Y. |
| [32] | Priority | Nov. 22, 1967 |
| [33] | | Germany |
| [31] | | K-63972 |

[54] OPERATING MECHANISM FOR MIRROR-REFLEX CAMERA
8 Claims, 2 Drawing Figs.

[52] U.S. Cl. ............................................. 95/42
[51] Int. Cl. ....................................... G03b 19/12
[50] Field of Search .................................. 95/42

[56] References Cited
UNITED STATES PATENTS
3,447,440  6/1969  Ettischer ................... 95/42

Primary Examiner—Samuel S. Matthews
Assistant Examiner—Richard L. Moses
Attorneys—Robert W. Hampton and James J. Wood ABSTRACT: A mirror reflex camera has a mirror pivoting mechanism that is set in response to film winding and released with the shutter. The mechanism moves the viewing mirror from a viewing position to a picture taking position, and a rapid advance lever is provided for successively displacing the film advancing mechanism by varying amounts, depending on the amount of film on the film winding spool, and for simultaneously imparting substantially constant amounts of energy to the mirror pivoting mechanism with each successive displacement of the film advancing mechanism.

HELMUT ETTISCHER
INVENTOR.

HELMUT ETTISCHER
INVENTOR.

OPERATING MECHANISM FOR MIRROR-REFLEX CAMERA

BACKGROUND OF THE INVENTION

1. Field of the Invention

This invention relates to cameras, and more particularly to actuating mechanisms for a mirror-reflex camera.

2. Description of the Prior Art

This invention relates to mirror-reflex cameras having mechanisms for causing a mirror to pivot into picture taking position when the camera shutter is released, and to pivot back immediately into viewing position when exposure is completed. This reflex camera has film advance and shutter cocking control means, preferably of the rapid winding type, whose actuation simultaneously brings the mirror pivoting mechanism into viewing position with release impending.

Film advance and shutter cocking means of this type are known in the art; they are equipped either with a central energy storage means or with several part energy storage means, for example in the form of spring mechanisms which are preloaded and, upon release of the camera, start the mechanism for the individual operations, it being generally necessary to provide special equalizing members in the chain of mechanisms because of the accuracy required for the chronological sequence, and the different lengths of travel to be covered. Consequently, said devices require a multitude of accurately relatively tuned components, requiring not only a relatively large space in the camera, but necessitating also a high cost of manufacture, assembly and adjustment. Moreover, their complex construction makes them very susceptible to trouble so that their dependability often leaves much to be desired.

SUMMARY OF THE INVENTION

The present invention comprises new and improved means for controlling movement of the various operating parts of a mirror-reflex camera.

According to the present invention a mirror-reflex camera is provided having a film advance and cocking control means arranged so that the control means also energizes a mirror pivot mechanism, while mechanism pivots the mirror into picture-taking position when the shutter is actuated and immediately pivots the mirror back into a viewing position when exposure has been completed.

The problems involved are solved by rigidly connecting the means for cocking the shutter and equalizing means comprising cam means for imparting energy to the mirror pivot mechanism, with the means for advancing the film. This measure, according to the invention, enables the differences in angular travel encountered during film advance, because of changing film roll diameters, to be equalized in a simple manner while still providing the constant lengths of cocking travel required to operate the mirror pivot mechanism and the shutter mechanism. In addition, it is proposed as being of particular advantage for the cam means to comprise a cam for the cocking of the mirror pivot mechanism, the cam having a rising section, followed by a cam section having only a minute rise, so that its radius may be considered as remaining practically constant, and to associate crank and linkage assemblies with shutter cocking to serve as an equalizing mechanism.

The invention has as its object to provide a film advance and cocking means of the aforementioned type avoiding the shortcomings of known constructions, said means being simple in construction, space-saving, easy and inexpensive in manufacture, and ensuring nevertheless, a maximum of dependability in operation.

The invention is more particularly described and illustrated in connection with the accompanying drawings which show diagrammatically an embodiment of the invention.

DESCRIPTION OF THE PREFERRED EMBODIMENTS

It is well known that, in the absence of an equalizing means, the film advance steps from image field to image field require decreasing rotating angles of the film advance control, with increasing film roll diameters, the rotating angles having to be equalized if combined with cocking operations involving constant length of travel. Such equalization is accomplished in the device according to the invention by suitable construction of the cocking mechanisms for the mirror pivot device, on the one hand, and the shutter, on the other hand, as can be gathered from the description which follows.

Figure 1:
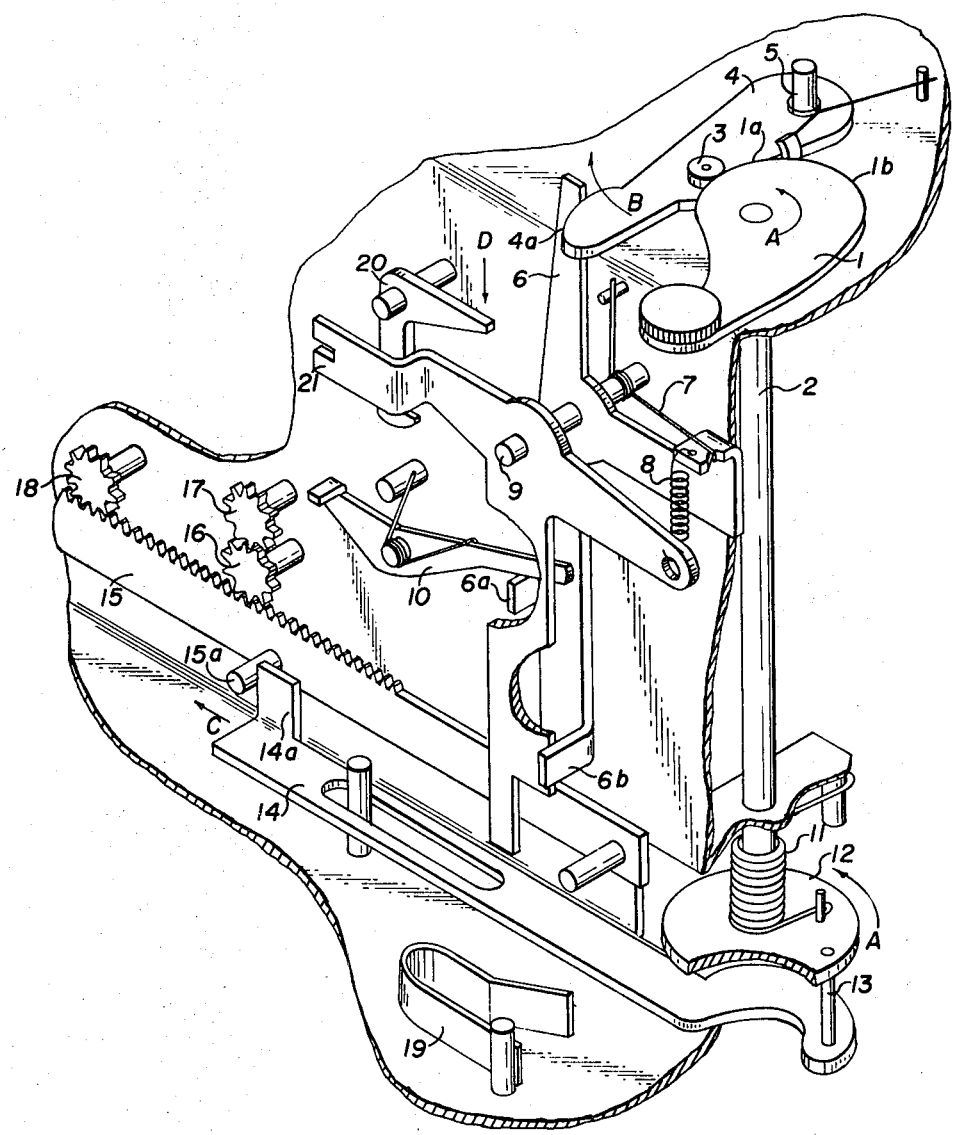
FIG. 1 shows the device according to the invention, with the camera shutter released.

When a shot has been taken and the camera, that is, the advance and cocking means thereof, is in the released position shown in FIG. 1, the camera is cocked again by operating movable control means comprising the rapid advance lever 1, thereby rotating the shaft rigidly connected thereto in the direction of the arrow A. Fixedly secured to the shaft 2 are also a film-advance gear member (not shown), which in known manner may be, for example, a toothed wheel, and the crank guide member 12 for cocking the shutter. When the rapid advance lever 1 swings from its first position in the direction of the arrow A, its rising cam section 1a, which of course may alternatively be associated, together with the cam section 1b, with a cam disc secured to the shaft 2, displaces movable means comprising an intermediate lever 4, through the roller 3, around the pivot 5 in the direction of the arrow B. The force-locking connection of the end 4a of the intermediate lever with the three-armed reset lever 6 of the mirror pivot device, causes the reset lever 6 to rotate against the action of the springs 7 and 8 about the shaft 9 until the spring-loaded locking lever 10 (which makes connection to the shutter) can snap in behind the lug 6a to cock the mirror.

Until then, the rapid advance lever 1 has moved through the minimum angle required for film advance, which corresponds to the length of travel required for the last image when the film roll diameter is greatest. The rising cam section 1a corresponds to this length of travel. It is followed for the excess travel required for the images advanced before the last image, by a cam section 1b whose degree of pitch is so small that it is practically concentric with the shaft 2. This minute pitch has no functional influence on the end position of the reset lever 6, but favors considerably the return of the rapid advance lever 1.

When the rapid advance lever 1 is rotated in the direction of the arrow A, the crank disc 12, together with the driving pin 13 is moved simultaneously in the same direction through the shaft 2 against the action of the spring 11 to effect displacement of a linkage to cock the camera shutter. This movement thus causes the rocker 14 to be shifted in the direction of the arrow C, said rocker taking along in the same direction, the preferably eccentrically adjustably disposed pin 15a and hence, the rack 15. As a result, the pinion 17 of the shutter cocking shaft is rotated through the intermediate gear 16 and the shutter is cocked. Simultaneously, through the gear 18 associated with the shutter opening shaft, the lens diaphragm blades are moved to their widest-aperture position.

Similar to the cocking mechanism for the mirror pivot device, the shutter cocking mechanism is designed so that the minimum angular travel of the film advance control 1 (as required for the last image) suffices to cock the shutter so that it is ready to release. The rotation of the crank disc 12 in excess of said minimum angular travel to complete each preceding film advance, causes but a slight additional linear shifting of the rocker 14 and the rack 15. This overtravel has been taken into consideration in the construction of the shutter in the movements of both the cocking and opening shafts.

To support the resetting force of the spring 11 during the return movement of the advance lever 1, a leaf spring 19 is provided, said leaf spring coming into engagement on the rocker 14 shortly before the driving pin 13 reaches its vertex position and until said driving pin has reached its end position so that it is effective in the area of dead center.

Figure 2:
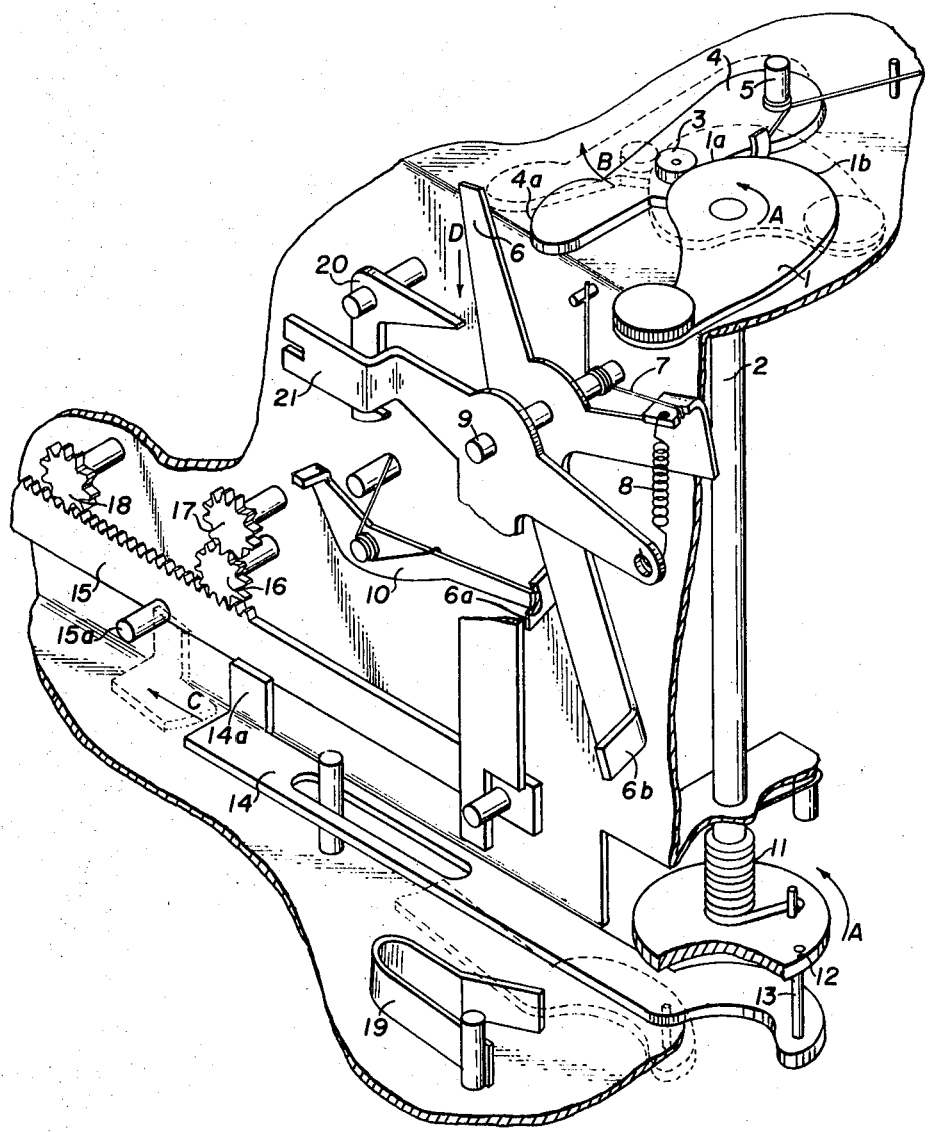
FIG. 2 shows the device according to the invention in cocked position with shutter release impending, the displacements of the various components for accomplishing this transition being indicated in phantom section.

After the rapid advance lever 1 has returned from its final or second position to its initial position, the camera is ready for release. This condition is shown in FIG. 2. When the shutter is released, the pawl 20 swings in the direction of the arrow D to release the lever 21. Under the action of the spring 8, said lever 21 swings counterclockwise thereby taking the mirror (not shown) into its shooting position. Moreover, the rack 15 is shifted against the direction of the arrow C, whereby the shutter is released through the opening shaft 18. With exposure completed, means connected to the shutter release member (not shown) rotate the locking lever 10 out of engagement on the lug 6a of the resetting lever 6. The spring 7 can then become effective to return the resetting lever 6 and, through the driving lug 6b thereof, the mirror control lever 21 into their initial positions shown in FIG. 1. This restores the camera, that is, the mirror, to its viewing position.

The construction of the mirror control as well as the film locking device and the like are not objects of the invention and need not be described here, since they are universally known in a wide variety of embodiments. The operation of the mirror is more completely described in the copending application for "Single-lens Reflex Camera," Ser. No. 744,968 filed July 15, 1968 and assigned to the same assignee as the instant invention.

The invention has been described in detail with particular reference to preferred embodiments thereof, but it will be understood that variations and modifications can be effected within the spirit and scope of the invention.

I claim:

1. A mirror-reflex camera including a mirror having a viewing position and a picture-taking position, and a shutter having an energized condition from which the shutter is releasable, the camera comprising:
   means displaceable a variable amount having a predetermined minimum for advancing film receivable in the camera a predetermined amount;
   a mirror pivoting mechanism coupled to the mirror and having an energized condition from which said pivoting mechanism is releasable with release of the shutter to move the mirror from the viewing position to the picture-taking position;
   means movable to energize said pivoting mechanism;
   control means for simultaneously displacing said film advancing means and moving said energizing means; and
   equalizing means for moving said energizing means a predetermined substantially constant distance when said film advancing means is displaced at least said minimum amount.

2. A mirror-reflex camera according to claim 1 wherein said equalizing means comprises a cam having a profile for controlling the amount of movement imparted to said energizing means.

3. A mirror-reflex camera according to claim 2 wherein the means movable to energize said mirror pivoting mechanism follows the profile of the cam,
   and wherein the profile of said cam has an initial section of high pitch followed by a section of practically constant diameter, such that energy is imparted to said mechanism substantially only when said energizing means is engaged with said initial section regardless of further rotation of the cam.

4. A mirror-reflex camera according to claim 1 further comprising means fixed relative to the film advancing means displaceable to energize the shutter.

5. A mirror-reflex camera according to claim 4 wherein said means for energizing the shutter comprises linkage means and crank means, the crank means being connected to the film advancement means and coupled to the linkage means, the displacement of the crank means displacing the linkage means to effect energization of the shutter.

6. A mirror-reflex camera according to claim 5 wherein actuation of said control means is accomplished by displacing said control means from a first position to a second position, and including spring means for restoring said control means to the first position.

7. The invention according to claim 1 including
   resetting means for said mirror pivoting mechanism; and
   lever means connected intermediate between said control means and said resetting means for displacement by said cam means, the displacement of said lever means actuating said resetting means for energizing said mirror pivoting mechanism.

8. A mirror-reflex camera including a mirror having a viewing position and a picture-taking position, and a shutter having a cocked condition from which the shutter is releasable, the camera comprising:
   rotatable means for advancing film receivable in the camera a predetermined amount by rotation of said means a variable amount having a predetermined minimum;
   a mirror pivoting mechanism coupled to the mirror and having a cocked condition from which said pivoting mechanism is releasable with the shutter to move the mirror from the viewing position to the picture-taking position and back to the viewing position;
   movable control means mounted on said film advancing means for simultaneously rotating said film advancing means to advance film receivable in the camera, cocking the shutter, and cocking said mirror pivoting mechanism;
   cocking means coupled to said control means and displaceable to cock said mirror pivoting mechanism; and
   cam means movable with said control means and having a profile with an initial section of high pitch followed by a section of substantially zero pitch, said profile being engageable with said cocking means for displacing said cocking means by the same amount when said control means rotates said film advancing means by at least said minimum amount.

PO-1050
(5/69)

UNITED STATES PATENT OFFICE
CERTIFICATE OF CORRECTION

Patent No. __3,580,154__    Dated __May 25, 1971__

Inventor(s) __Helmut Ettischer       October 7, 1971__

It is certified that error appears in the above-identified patent and that said Letters Patent are hereby corrected as shown below:

Column-4        Claim-7        Line-5

Delete "cam"
Insert --Control--

Signed and sealed this 18th day of January 1972.

(SEAL)
Attest:

EDWARD M. FLETCHER, JR.    ROBERT GOTTSCHALK
Attesting Officer            Acting Commissioner of Patents